(12) United States Patent
Howard

(10) Patent No.: US 9,451,849 B2
(45) Date of Patent: Sep. 27, 2016

(54) ROASTING AND BASTING DEVICE

(71) Applicant: Dominique Howard, Kansas City, MO (US)

(72) Inventor: Dominique Howard, Kansas City, MO (US)

( * ) Notice: Subject to any disclaimer, the term of this patent is extended or adjusted under 35 U.S.C. 154(b) by 0 days.

(21) Appl. No.: 14/956,971

(22) Filed: Dec. 2, 2015

(65) Prior Publication Data

US 2016/0198900 A1    Jul. 14, 2016

Related U.S. Application Data

(60) Provisional application No. 62/101,687, filed on Jan. 9, 2015.

(51) Int. Cl.
*A47J 37/10* (2006.01)

(52) U.S. Cl.
CPC .................................. *A47J 37/106* (2013.01)

(58) Field of Classification Search
CPC ...... A47J 37/041; A47J 37/10; A47J 37/106; A47J 37/108
USPC .................... 99/345–347, 415, 516
See application file for complete search history.

(56) References Cited

U.S. PATENT DOCUMENTS

| 427,671 | A | | 5/1890 | Carpenter | |
|---|---|---|---|---|---|
| 1,700,614 | A | * | 1/1929 | Moore | A47J 37/10 417/208 |
| 1,789,349 | A | | 1/1931 | Ballman | |
| 1,977,486 | A | | 10/1934 | Louis | |
| 2,352,292 | A | | 6/1944 | Schaefer | |
| 3,055,287 | A | | 9/1962 | Henry | |
| 3,922,960 | A | * | 12/1975 | Lewis | A47J 37/106 99/345 |
| 5,421,254 | A | * | 6/1995 | McDonald | A47J 37/106 99/346 |
| 5,727,449 | A | * | 3/1998 | Healy | A47J 37/106 99/346 |
| 6,053,095 | A | * | 4/2000 | Ting | A47J 37/106 99/346 |
| 6,125,738 | A | * | 10/2000 | Poister | A47J 43/284 126/369 |
| 6,588,324 | B1 | * | 7/2003 | Mor | A47J 37/106 99/330 |
| 8,881,644 | B1 | * | 11/2014 | Scro, II | A47J 37/0629 99/345 |
| 2004/0177768 | A1 | * | 9/2004 | Rubin | A47J 37/106 99/345 |
| 2006/0112835 | A1 | * | 6/2006 | Healy | A47J 37/106 99/345 |
| 2007/0272087 | A1 | * | 11/2007 | Hull | A47J 37/106 99/345 |

* cited by examiner

*Primary Examiner* — Dana Ross
*Assistant Examiner* — Lindsey C Teaters
(74) *Attorney, Agent, or Firm* — Global Intellectual Property Agency, LLC; Daniel Boudwin

(57) ABSTRACT

A cooking device for roasting and basting food. The cooking device includes a roasting pan and lid forming a defined interior volume. The roasting pan includes a base, one or more sidewalls, and an open upper end. Along the interior of the sidewalls of the roasting pan, one or more tubes extend upwardly onto the lid and towards a centrally located reservoir. A pump is disposed on the exterior of the lid and allows a user to selectively baste food during the cooking process. The tubes and reservoir are operably connected to the pump, wherein the pump, once actuated, draws fluids through each tube and into the reservoir. The reservoir includes one or more openings for dispersing the fluids therefrom for basting food located within the roasting pan.

9 Claims, 3 Drawing Sheets

ROASTING AND BASTING DEVICE

CROSS REFERENCE TO RELATED APPLICATION

This application claims the benefit of U.S. Provisional Application No. 62/101,687 filed on Jan. 9, 2015. The above identified patent application is herein incorporated by reference in its entirety to provide continuity of disclosure.

BACKGROUND OF THE INVENTION

The present invention relates to cooking devices. More specifically, the present invention provides a cooking device for roasting and selectively basting food.

Roasting food, such as meat, requires basting the meat to allow the end product to be juicy and moist. Basting involves pouring the liquid accumulated at the bottom of the roasting pan over the food while cooking in order to keep it moist. However, conventional roasting pans include a lid that must be removed in order for the user to baste the food. When the lid is removed, heat from the cooking process escapes the roaster, which results in a longer cook time. Therefore, there exists a need in the prior art for a cooking device that allows a user to baste without removing the lid of the roaster.

Devices have been disclosed in the prior art that relate to cooking devices. These include devices that have been patented and published in patent application publications. These devices generally relate to combination ovens and roasting pans, such as U.S. Pat. No. 3,055,287, U.S. Pat. No. 2,352,292, and U.S. Pat. No. 1,977,486.

These prior art devices have several known drawbacks. The devices in the prior art fail to provide a plurality of tubes extending upward from a roasting pan to a lid in order to draw fluid from the roasting pan for release from the lid. Further, the prior art fails to provide a pump as a means to selectively draw the fluid through the tubes.

In light of the devices disclosed in the prior art, it is submitted that the present invention substantially diverges in design elements from the prior art and consequently it is clear that there is a need in the art for an improvement to existing cooking devices. In this regard the instant invention substantially fulfills these needs.

SUMMARY OF THE INVENTION

In view of the foregoing disadvantages inherent in the known types of roasting and basting devices now present in the prior art, the present invention provides a new roasting and basting device wherein the same can be utilized for providing convenience for the user when selectively basting food without removing the lid of a cooking device.

It is therefore an object of the present invention to provide a new and improved roasting and basting device that has all of the advantages of the prior art and none of the disadvantages.

It is another object of the present invention to provide a roasting and basting device comprising a lid removably covering a roasting pan, wherein a the roasting pan comprises a base, one or more sidewalls, and an open upper end for receiving food therein.

Another object of the present invention is to provide a roasting and basting device comprising one or more tubes extending upward from the roasting pan to a centrally located reservoir positioned on the lid, wherein each tube includes an open lower end for receiving liquid from the base of the roasting pan.

Yet another object of the present invention is to provide a roasting and basting device further comprising a pump as a means for drawing the fluid from the roasting pan into the tubes.

Yet another object of the present invention is to provide a roasting and basting device further comprising one or more openings disposed on the reservoir and in fluid communication with the tubes in order to disperse the liquid therefrom over the food positioned therebelow.

Another object of the present invention is to provide a roasting and basting device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
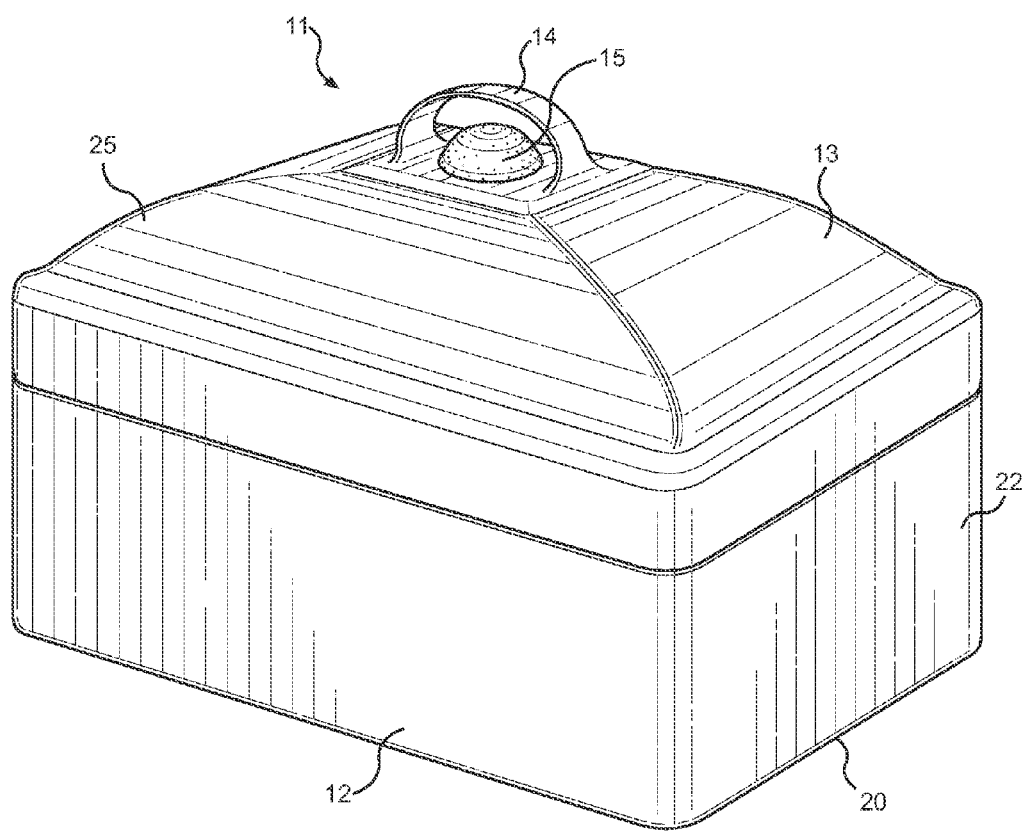
FIG. 1 shows a perspective view of the roasting and basting device.

Reference is made herein to the attached drawings. Like reference numerals are used throughout the drawings to depict like or similar elements of the roasting and basting device. For the purposes of presenting a brief and clear description of the present invention, the preferred embodiment will be discussed as used for selectively basting food without removing the lid of a cooking device. The figures are intended for representative purposes only and should not be considered to be limiting in any respect.

Figure 2:
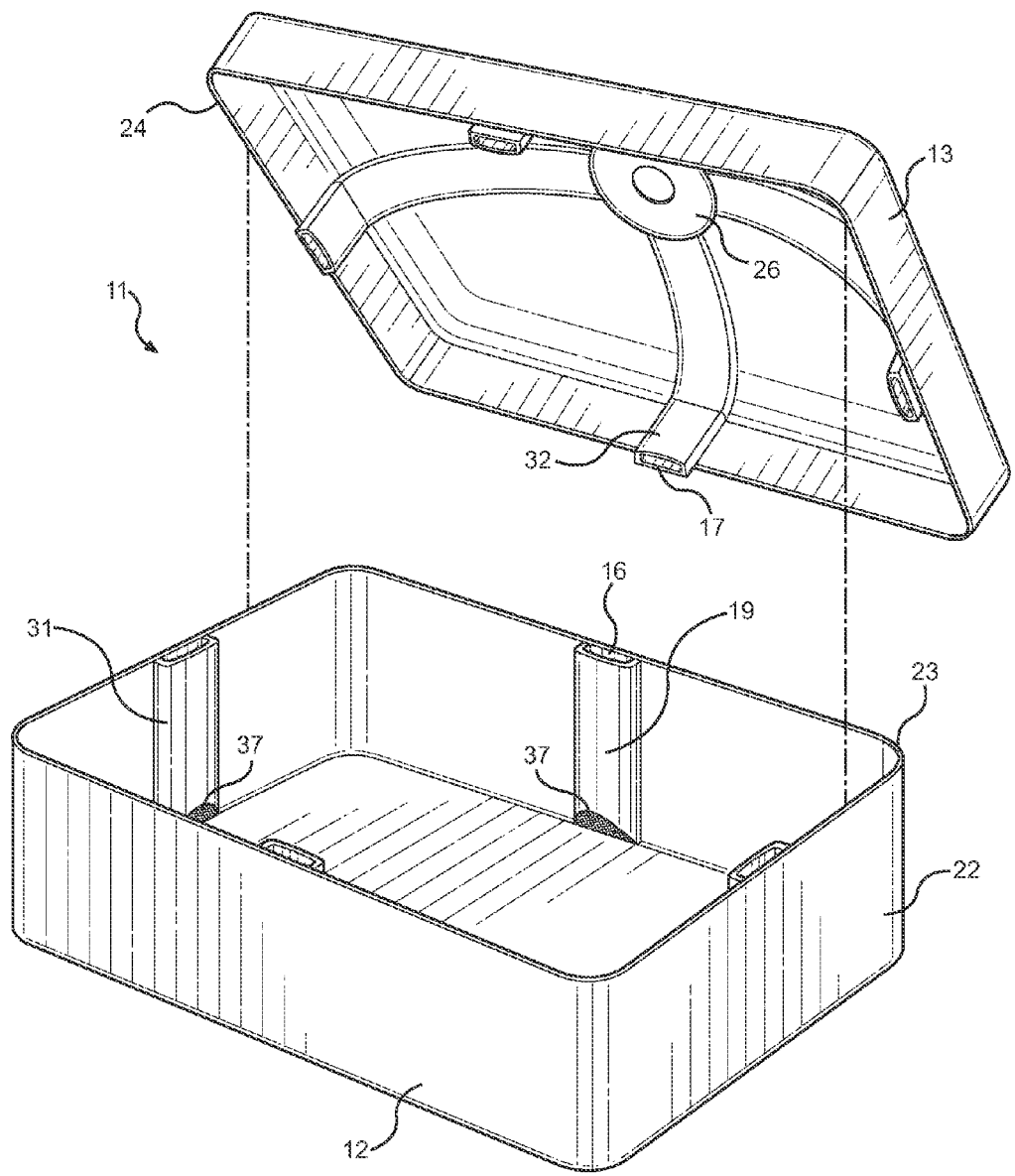
FIG. 2 shows a perspective view of the roasting and basting device wherein the lid is separated from the roasting pan.

Referring now to FIGS. 1 and 2, there is shown a perspective view of the roasting and basting device and a perspective view of the roasting and basting device wherein the lid is separated from the roasting pan, respectively. The roasting and basting device 11 comprises a lid 13 removably covering a roasting pan 12, wherein the roasting pan 12 includes a base 20, one or more sidewalls 22, and an open upper end 23 for receiving food therein. The roasting pan 12 receives food, such as meat, for roasting. In the illustrated embodiment, the roasting pan 12 comprises a rectangular shape. However, in alternate embodiments, the roasting pan 12 comprises any suitable shape, such as a cylinder.

The lid 13 comprises an open lower end 24 and an upper wall 25 configured to removably cover the open upper end 23 of the roasting pan 12 so as to prevent heat from escaping during the cooking process. In the illustrated embodiment, the lid 13 comprises a cross section having a rectangular shape with substantially the same dimension of the open upper end 23 of the roasting pan 12 so as to provide full coverage thereover. In other embodiments, the lid 13 comprises any suitable shape as long as it is configured to removably cover the open upper end 23 of the roasting pan 12. In some embodiments, the lid 13 further comprises a handle 14 disposed thereon for allowing a user to conveniently separate the lid 13 from the roasting pan 12.

The roasting and basting device 11 further comprises a plurality of tubes 19 extending upward from a lower end of the roasting pan 12 to the lid 13. Each tube 19 comprises an open lower end for receiving liquid from the base 20 of the roasting pan 12. Preferably, the open lower end is covered by a screen 37 for filtering out solid food from the liquid. The screen 37 comprises the same dimension as that of the lower end of the tube 19 so as to fasten thereto via a press fit. In the illustrated embodiment, the upper end of each tube 19 terminates at a centrally located reservoir 26 on the lid 13 in order to collect liquid received in the tubes 19. In use, the liquid accumulates during the cooking process from the juices that are extracted from the food in the roasting pan 12 and any fluids added thereto. In the illustrated embodiment, each tube 19 further comprises a first section 31 removably secured to a second section 32, wherein the first section 31 is disposed in the roasting pan 12 and the second section 32 is disposed in the lid 13. The first section 31 comprises an open upper end 16 in order to allow the liquid to travel into the corresponding second section 32 of the tube 19 positioned on the lid 13, while still allowing the lid 13 to separate from the roasting pan 12. The corresponding second section 32 comprises an open lower end 17 that fits over the upper end 16 of the first section 31 via an air tight seal. Preferably, an air tight seal is created therebetween in order to allow liquid to be efficiently drawn upward through the tubes 19 via a pump. The air tight seal may be accomplished via a gasket or any known methods of creating an air tight seal in the prior art.

In the illustrated embodiment, the first section 31 of each tube 19 extending along the roasting pan 12 is positioned against the sidewalls 22 thereof. Likewise, the corresponding second section 32 of the tube 19 on the lid 13 is positioned along the upper wall 25 thereof so as to align with the first section 31 for efficient transport of liquid therethrough. Preferably, the tubes 19 are positioned against or near the sidewalls 22 in order to provide maximum space for food to be placed in the interior volume of the roasting pan 12. However, the depicted embodiment of the tubes 19 of the present invention is merely illustrative and the present disclosure contemplates other embodiments of the present invention utilizing other positioning of the tubes and different shaped tubes to allow liquid to be transported from the base 20 of the roasting pan 12 to the lid 13 for dispersal over food positioned below the lid 13 in the roasting pan 12.

Figure 3A:
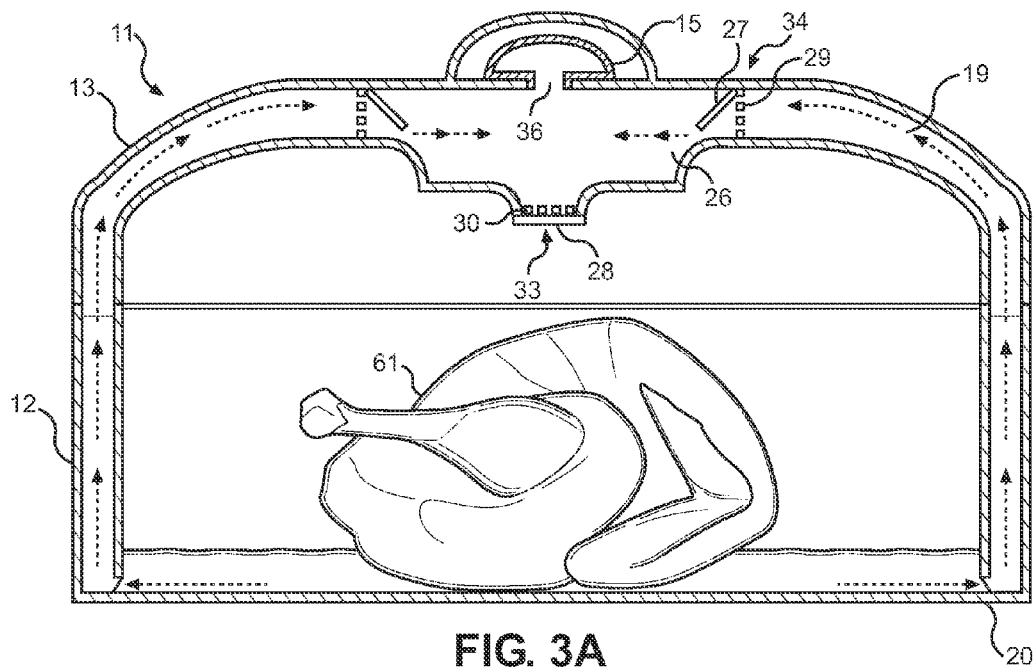
FIG. 3A shows a cross sectional view of the roasting and basting device wherein the pump is depressed.
Figure 3B:
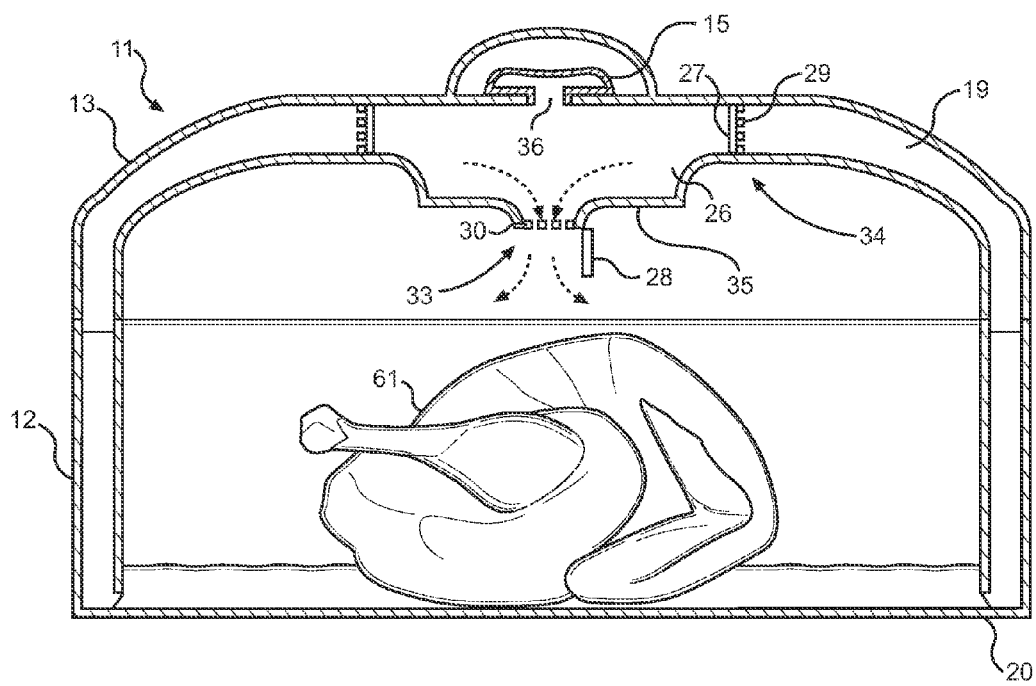
FIG. 3B shows a cross sectional view of the roasting and basting device wherein the pump is released.

Referring now to FIGS. 3A and 3B, there are shown cross sectional views of the roasting and basting device. The flow of liquid through the tubes 19 is selectively controlled by a pump 15. In the illustrated embodiment, the pump 15 is positioned on the exterior of the device 11, wherein the pump 15 displaces air within the reservoir 26 and tubes 19 in order to create suction. In the illustrated embodiment, the roasting and basting device 11 further comprises one way valves 33, 34 that are operably connected to the pump 15 in order to control the flow of liquid. There is at least one valve 34 that controls the flow of liquid from the tubes 19 into the reservoir 26 and at least one valve 33 that controls the flow of liquid from the reservoir 26 to out thereof and into the roasting pan 12. Preferably, the pump 15 is composed of any suitable flexible material, such as rubber. As the pump 15 is depressed, liquid is dispersed from the reservoir 26 into the roasting pan 12. As the pump 15 is released, fluid is drawn into the tubes 19 through the open lower end thereof.

In the illustrated embodiment, the pump 15 is disposed on the top of the lid 13, wherein an opening 36 is positioned in the lid 13 beneath the pump 15 in order to allow air to flow from the interior of the pump 15 to the tubes 19 and the reservoir 26. The reservoir 26 comprises an open upper end in order to receive liquid therethrough and a base 35 having one or more openings thereon. The base 35 of the reservoir 26 is positioned lower than the upper end of each tube 19 so as to serve to collect liquid drawn through the tubes 19 therein. The opening allows the liquid collected in the reservoir 26 to disperse therethrough onto food positioned below the reservoir 26.

In the illustrated embodiment, the reservoir 26 comprises an opening on the base 35 thereof that is removably covered by a first valve 33. The first valve 33 comprises the opening, a valve seat 30, and a baffle 28, wherein the first valve 33 is configured to control the flow of liquid from the reservoir 26, out through the opening, and into the roasting pan 12. The valve seat 30 is positioned parallel to and along the periphery of the opening and configured to receive the baffle so as to prevent liquid from flowing through the opening when the first valve 33 is in the closed position. Further, the valve seat 30 includes a plurality of apertures thereon configured to allow the liquid to spray onto the food 61 when the first valve 33 is open. In some embodiments, the apertures comprise angled edges in order to provide a directional spray. The baffle 28 is pivotally secured to the reservoir 26, adjacent to the opening, wherein the baffle 28 removably covers the opening and the valve seat 30 in order to prevent liquid from flowing therethrough.

In the illustrated embodiment, a second valve 34 is positioned within each tube 19 for controlling the flow of liquid therethrough. Similar to the first valve 33, each second valve 34 comprises an opening within the tube 19, a baffle 27, and a valve seat 29, wherein the valve seat 29 is positioned between the sidewalls of the tube 19. The valve seat 29 comprises one or more apertures to allow liquid to flow therethrough and receives the baffle 27 thereon when the second valve 34 is closed so as to prevent liquid from flowing through the apertures. The baffle 27 is pivotally secured to the tube 19. In other embodiments, any suitable valve may be used, such as a check valve or butterfly valve. However, the depicted embodiment of the pump and valve configuration of the present invention is merely illustrative and the present disclosure contemplates other embodiments of the present invention utilizing other types of pumps and valves having other suitable configurations to allow liquid to be drawn through the tubes and dispersed over food positioned in the roasting pan.

In operation, food 61 is positioned in the roasting pan 12 and the lid 13 is placed over the open upper end of the pan 12, wherein the upper and lower ends of the tubes 19 are aligned. The user applies heat to the roasting and basting device 11, wherein juices from the food accumulate on the base 20 of the roasting pan 12. The user depresses the pump 15 positioned on the exterior of the device 11 until the air within the reservoir 26 and tubes 19 is displaced. Once the air is displaced, liquid is suctioned into the reservoir 26 via the tubes 19. Once the reservoir 26 has basting liquid therein, the pump 15 is depressed in order to open the baffle 28 disposed over the opening of the first valve 33 of the reservoir 26 and release liquid collected therein onto the food 61 in the pan 12. As the pump 15 is depressed, the baffles 27 of the second valves 34 are configured to close in order to provide pressure to open the baffle 28 of the first valve 33. As the user releases the pump 15, the baffle 28 of the first valve 33 is closed and the baffle 27 of the second valves 33 are opened so as to draw the liquid through the tubes 19 and into the reservoir 26. The user repeats the basting process by selectively depressing the pump 15 throughout the cooking time in order to keep the food moist and tasty.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A roasting and basting device, comprising:
    a roasting pan having a base, one or more sidewalls, and an open upper end for receiving food therein;
    a lid removably covering said open upper end of said roasting pan;
    one or more tubes extending upward from said base of said roasting pan to said lid, wherein each of said one or more tubes includes an open lower end for receiving liquid from said base;
    wherein an upper end of each of said one or more tubes terminates at a reservoir configured to collect said liquid therein;
    one or more openings disposed on said reservoir and configured to release said liquid therethrough into said roasting pan;
    a pump operably connected to said one or more tubes and said reservoir, wherein said pump is configured to draw said liquid from said open lower end of said one or more tubes and through said one or more openings of said reservoir;
    a first valve removably covering each of said one or more openings of said reservoir and a second valve removably covering an upper end of each of said one or more tubes, wherein said first valve and said second valve are operably connected to said pump and configured to control a flow of said liquid as said pump is actuated;
    said second valve configured to control a flow of said liquid through said upper end of each of said one or more tubes.

2. The roasting and basting device of claim 1, wherein said roasting pan comprises a rectangular shape.

3. The roasting and basting device of claim 1, further comprising a handle disposed on said lid.

4. The roasting and basting device of claim 1, further comprising a screen covering said open lower end of each of said one or more tubes.

5. The roasting and basting device of claim 1, wherein said first valve is configured to control the flow of liquid from the one or more openings into the roasting pan.

6. The roasting and basting device of claim 1, wherein actuation of said pump causes said second valve to open and said first valve to close, said pump suctioning said liquid from said roasting pan into said reservoir via said one or more tubes.

7. The roasting and basting device of claim 1, wherein actuation of said pump causes said first valve to open and said second valve to close, said pump causes said first valve to release said liquid from said reservoir into said roasting pan.

8. The roasting and basting device of claim 1, wherein said first valve is operably connected to said second valve, whereon said first valve is open if said second valve is closed.

9. The roasting and basting device of claim 1, wherein said first valve is operably connected to said second valve, whereon said first valve is closed if said second valve is open.

* * * * *